TELEVISION CHANNEL SELECTING APPARATUS

Original Filed April 3, 1957 2 Sheets-Sheet 1

INVENTORS
Stanley R. Meadows and
BY Sarkes Tarzian
Mason, Kolehmainen, Rathburn and Wyss.
Attys.

TELEVISION CHANNEL SELECTING APPARATUS

Original Filed April 3, 1957

2 Sheets-Sheet 2

INVENTORS
Stanley R. Meadows and
Sarkes Tarzian
BY Mason, Kolehmainen, Rathburn and Wyss.
Attys.

3,247,437
TELEVISION CHANNEL SELECTING APPARATUS

Stanley R. Meadows, Bloomington, and Sarkes Tarzian, Indianapolis, Ind., assignors to Sarkes Tarzian, Inc., Bloomington, Ind., a corporation of Indiana
Continuation of application Ser. No. 650,502, Apr. 3, 1957. This application May 11, 1965, Ser. No. 459,507
22 Claims. (Cl. 318—467)

The present invention relates to television receivers and more particularly to apparatus for operating television receivers from remote locations. Specifically, this application is a continuation of our prior application Serial No. 650,502, filed April 3, 1957, assigned to the same assignee as the present invention, now abandoned.

Television receivers of the type presently used include tuners of the step-tuned type having a coarse tuning control shaft which is rotatable in angular increments to tune the receiver to the various channels in which television signals are transmitted. Since in many geographical areas a number of television programs are simultaneously televised on respectively different channels, and since televised programs are ordinarily viewed at a distance which is out of arm's reach from the receiver, it would be desirable to provide means to enable the viewer to operate the receiver directly from his viewing station. Remote control apparatus for tuning radio and television receivers has, of course, been available for many years, but such apparatus has left much to be desired in the way of low manufacturing cost, simplicity of use and reliability of operation.

Therefore, a principal object of the present invention is to provide a new and improved apparatus for controlling a television receiver from a remote location.

Another object of this invention is to provide new and improved apparatus for controlling the angular position of a shaft from a remote location.

A further object of this invention is to provide apparatus for tuning a television receiver from a remote location, which apparatus is inexpensive to manufacture, easy to use and reliable in operation.

Briefly, the above and further objects are realized in accordance with the present invention by providing remote control apparatus comprising an electric motor which drives the coarse tuning shaft of a television receiver through a clutch, a reduction gear assembly and an incremental drive connection. The control circuit for the motor comprises a channel change switch, a preselector switch and other switches connected in such manner that each time the channel change switch is momentarily actuated, the tuning shaft is rotated the required amount to tune the receiver to the next channel in which a receivable signal may be present. Moreover, the incremental drive connection and the energization circuit of the motor is such that the receiver may be manually tuned without first disconnecting the remote control apparatus for rendering it inoperative.

The invention, both as to its organization and method of operation, together with further objects and advantages thereof, will best be understood by reference to the following specification taken in connection with the accompanying drawings, in which.

Figure 2:
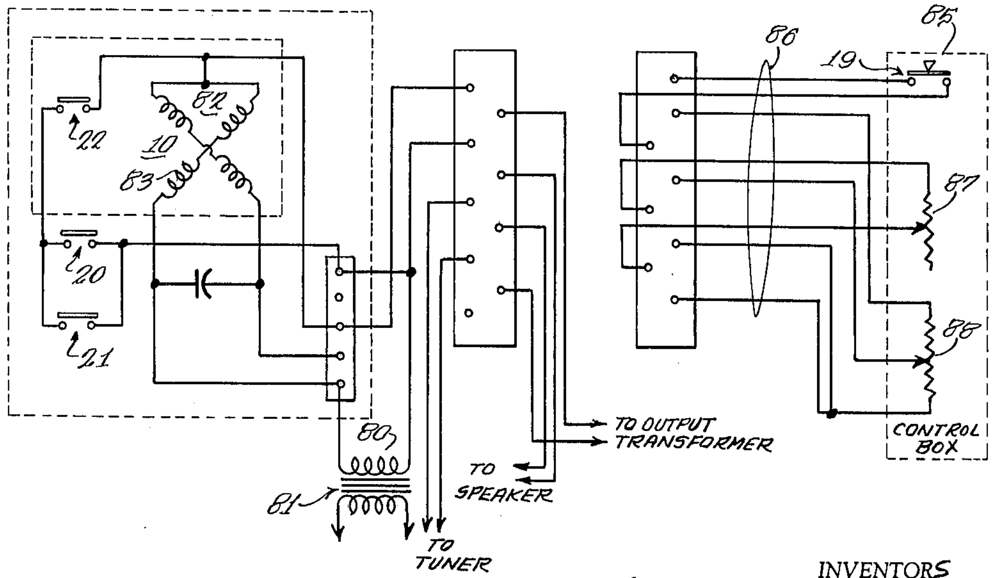
FIG. 2 is a schematic electric circuit diagram of the remote control apparatus embodying the present invention.

Referring now to the drawings, the remote control apparatus which is there illustrated and which embodies the present invention comprises as its principal elements an electric motor 10 which drives a coarse tuning shaft 11 of a tuner 12 of a television receiver (not shown) through the medium of a clutch mechanism 14, a reduction gear assembly 15 and a Geneva gear type incremental drive connection 16. The control circuit for the motor 10 is best shown in FIG. 2 and comprises a channel change switch 19, a preselector switch 20, a disconnect switch 21 which insures that the tuning shaft 11 is disconnected from the remote control apparatus except during actual positioning thereof by the remote control apparatus so as to permit unobstructed manual control of the receiver, and a switch 22 which prevents energization of the motor 10 during manual tuning of the receiver.

Considering in detail the remote control apparatus embodying the present invention, the motor 10 comprises a laminated stator 25, an armature 26, and a plurality of field windings 27 which are wound in the conventional manner on respective legs of the stator 25. The motor 10 is mounted on a vertical support plate 30 by means of a pair of screws 31 which extend through apertures in diagonally opposite corners of the stator 25 and through suitable spacer sleeves 32 into the support plate 30. The armature 26 is mounted for rotational as well as slidable axial movement with respect to the stator 25 on a shaft 33. The shaft 33 is journaled in a pair of bearings 36 which are disposed at opposite sides of the armature 26 and supported by a set of brackets 34 and a set of leaf spring support members 37 which are riveted to the brackets 34. As shown, the brackets 34 extend diagonally across opposite sides of the stator 25 and are suitably secured thereto by means of a plurality of bolts 35. Axial movement of the bearings 36 is prevented by their flanges *36a* which are disposed between the respective brackets 34 and support members 37.

The clutch 14 which selectively couples the shaft 33 to the reduction gear assembly 15 comprises a bearing sleeve 41 which is slidably and rotatably positioned over the shaft 33, a pinion gear 42 which is fixedly mounted on the sleeve 41 and engages a gear 40 of the assembly 15, and a pair of clutch members 43 and 44. The driving clutch member, designated 43, is fixedly attached to the shaft 33 near the forward end thereof and the driven member, designated 44, is fixedly attached to the gear 42 and to the sleeve 41. The driven member 44, which is thus axially movable with respect to the shaft 33, is provided with a pair of lugs 45 positioned at diametrically opposed points of the shaft 33 and which extend toward the driving member 43 for engagement with a pair of diametrically opposed radially extending lugs 46, 47 in the member 43 when the members 43 and 44 are moved into engagement. When the members 43 and 44 are in driving engagement the edges of the lugs 46, 47 engage the side edges of the lugs 45.

The members 43 and 44 are biased out of engagement by means of a helical spring 50 which surrounds the shaft 33 and is interposed between the driving and driven members 43 and 44. When the windings 27 of the motor 10 are energized, the armature 26 is pulled from its normal rest and biased position as viewed in FIG. 3 toward a balanced condition of symmetry wherein its central plane coincides with the principal central plane of the stator 25. This pulls the driving member 43 against the force of the spring 50 into coupling engagement with the driven member 44 to connect the shaft 33 to the reduction gear assembly 15.

Figure 1:
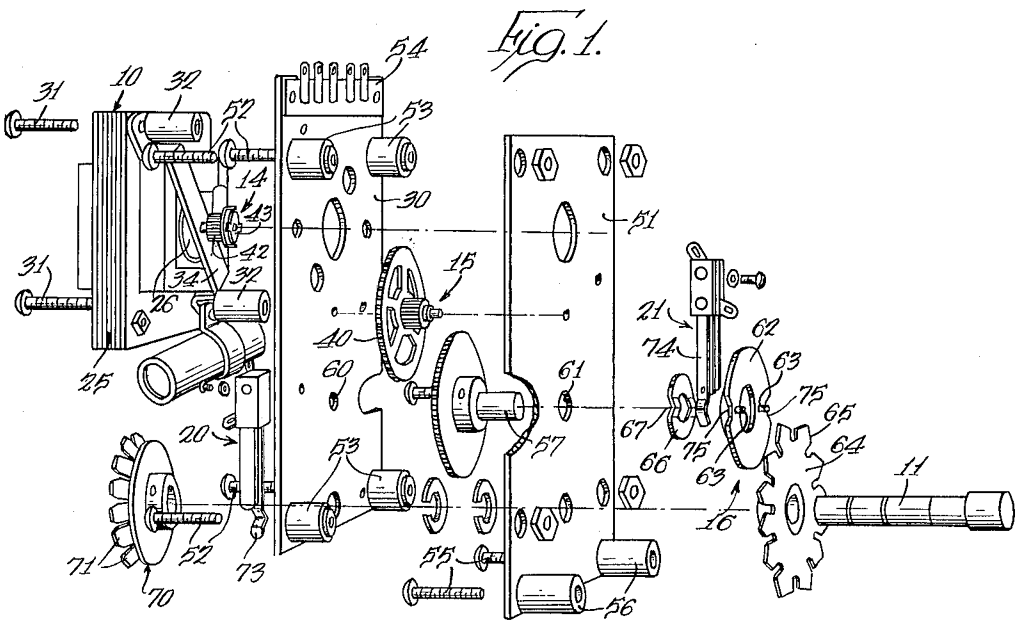
FIG. 1 is an exploded perspective view of a portion of the remote control apparatus of the present invention.
Figure 3:
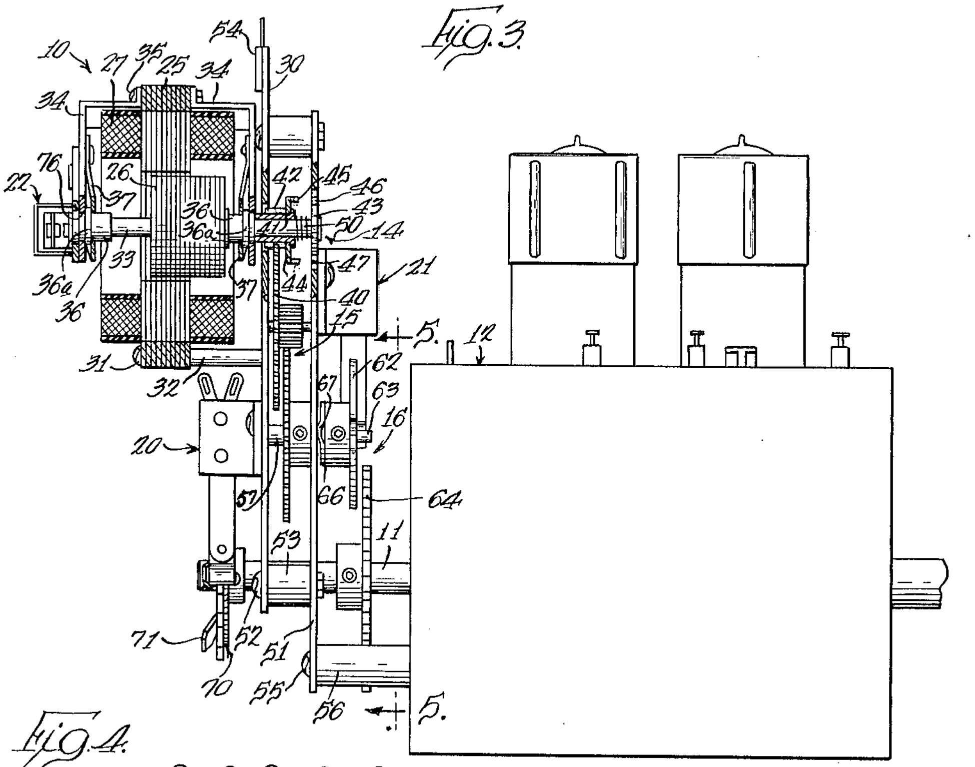
FIG. 3 is a side elevational view partly in section of a portion of the remote control tuning apparatus of the present invention.

As best shown in FIGS. 1 and 3, the clutch 14 and the reduction gear assembly 15 are mounted between the supporting plate 30 and a supporting plate 51 which is secured to the plate 30 by means of a plurality of bolts 52. The plates 30 and 51 are maintained in parallel spaced apart relationship by means of a plurality of spacer sleeves 53. As best shown in FIG. 3, the rear plate 30 extends above the top of the forward plate 51 and the plate 51 extends below the lower portion of the plate 30. The support plates 30 and 51 are thus arranged in offset relationship in mutually parallel planes with the upper portion of the plate 30 providing a suitable support for a terminal assembly 54 and the lower portion of the plate 51 providing a convenient mounting surface for attaching the remote control apparatus to the chassis of the tuner 12. This is accomplished by means of a plurality of bolts 55 and associated spacers 56.

The reduction gear assembly 15 is provided with an output shaft 57 which is journaled in suitable apertures 60 and 61 in the support plates 30 and 51, respectively, and in accordance with an important aspect of this invention a disk 62 is mounted on the forward end of the shaft 57. The disk is the driving member of the incremental drive connection 16 and in addition controls the operation of the switch 21.

In order to provide a relatively small contact area between the disk assembly 62 and the plate 51, a washer 66 having a reversely bent intermediate portion 67 is interposed between the disk assembly 62 and the plate 51 thereby to reduce the frictional contact area between these two relatively rotatable parts.

The disk 62 has a plurality of pins 63 thereon which extend parallel to the principal axis of the shaft 57 from angular displaced positions thereon.

As best shown in FIG. 3, the shaft 57 and the tuner shaft 11 are parallel and adapted to be interconnected by means of a star wheel 64 which is fixedly mounted on the tuning shaft 11 so as to be selectively engageable by the pins 63. Therefore, as the disk 62 rotates, the pins 63 respectively engage one of a plurality of radially extending arms 65 of the wheel 64 and rotate the shaft 11 through a predetermined angle. In the illustrated embodiment of the invention, two pins 63 and twelve arms 65 are provided. Therefore, for each complete revolution of the shaft 57 the tuning shaft 11 is rotated through two angular increments of thirty degrees. Moreover, during every complete revolution of the shaft 57 there are two arcuate segments of approximately ninety degrees each during which the shafts 57 and 11 are mutually disconnected. Therefore, if the motor 10 is disconnected from the gear assembly 15 with the disk 62 in either of these positions, the shaft 11 is disconnected from the remote control apparatus.

Figure 4:
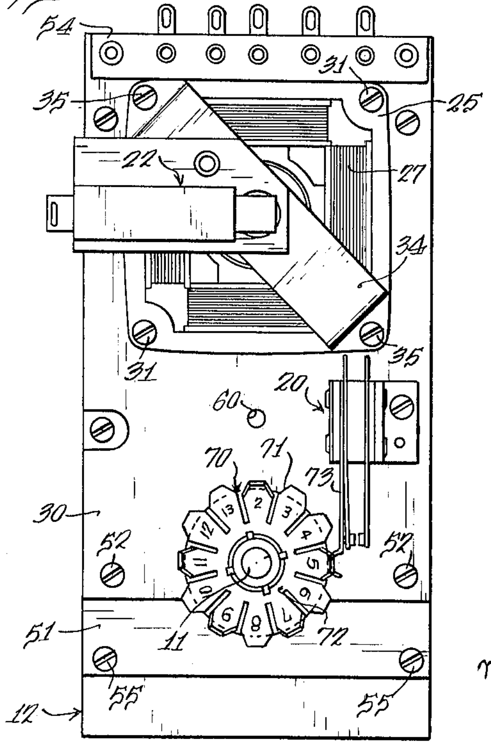
FIG. 4 is a rear elevational view of the device of FIG. 3 assuming the entire structure to be shown therein.
Figure 5:
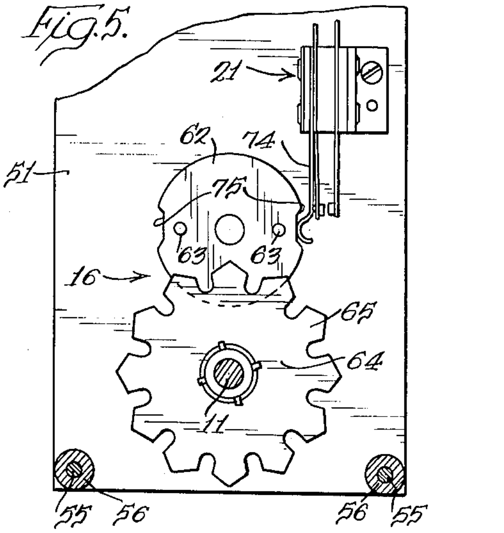
FIG. 5 is a sectional view of the device of FIG. 3 taken along the line 5—5 thereof.

In the embodiment of the invention which is illustrated in FIG. 1, the star wheel 64 is provided with twelve arms 65, one for each of the twelve angular positions at which the tuning shaft 11 may be positioned in order to tune in each of the twelve channels possibly receivable in a VHF television system. It will be understood, of course, that more or less arms 65 may be provided if it is desired to rotate the shaft 11 into more or less predetermined angular positions. Also, the arms 65 are spaced apart by a distance slightly greater than the diameter of the pins 63 and have a triangularly shaped head. In order to actuate the switch 20 so as to deenergize the motor 10 whenever the shaft 11 is positioned so as to tune in one of the channels in which reproducible television signals are transmitted, a preselector assembly 70 is mounted on the rearward end of the shaft 11 and is adapted to open the switch 20 whenever the shaft 11 is in one of its stable positions. As best shown in FIG. 4, the assembly 70 comprises a disk 72 having twelve spaced apart lugs 71 extending radially therefrom. The lugs 71 are respectively adapted to engage an arm 73 of the switch 20 as the shaft 11 is rotated to each of its twelve stable positions. Since, however, reproducible signals are not ordinarily receivable by any one receiver on all twelve channels means are provided for maintaining the motor 10 energized while the shaft 11 is positioned to receive one of these nonreproducible signals. To this end the disk 72 is constructed of a relatively pliable metal, such, for example, as lead so that the lugs 71 may be manually bent over out of engageable position with the actuating arm 73 of the switch 20. The lugs 71 are provided on the outwardly directed faces thereof with the respective numbers or designations of the channels to which the receiver is tuned when the shaft 11 is at its various angular positions wherein the lugs 71 are positioned for possible engagement with the actuating arm 73. At the time of installation of the receiver, those ones of the lugs 71 which correspond to channels which are receivable by the receiver are bent away from the plate 30 and thus toward the rear of the television receiver in which the apparatus of the present invention is mounted, so as not to engage the arm 73 when the shaft 11 is in the channel selector corresponding to that particular lug. Therefore, only those lugs which correspond to channels which are not receivable, engage the arm 73 and thus close the switch 20 when the shaft is in these corresponding positions. As will be apparent from the circuit diagram of FIG. 2 and as described in greater detail hereinafter, while the switch 20 is closed during a remote control tuning operation the motor 10 is energized and thus continues to rotate the tuning shaft 11, which rotation continues until the switch 20 is opened at the next receivable channel. In this manner, each time that the channel change switch 19 is actuated, the shaft 11 is rotated in step-by-step fashion until a preselected channel is tuned in, at which time the motor 10 is deenergized and movement of the shaft 11 terminates.

The switch 21 serves a number of different functions in the control apparatus of the present invention. Primarily, it prevents deenergization of the motor 10 when the tuning shaft 11 is connected through the Geneva gear assembly 16 to the reduction gear assembly 15. Secondly, it takes over control of the motor 10 a short time after the switch 19 is closed so that the switch 19 need only be momentarily actuated to adjust the tuner 12 for reception of the next selectable channel.

Therefore, in accordance with the present invention the switch 21 is provided with an actuating arm which is self-biased against the periphery of the disk 62 toward a switch opening position. In order to open the switch 21 when the pins 63 are out of engagement with the star wheel 64, a pair of recesses 75 are provided in the periphery of the disk 62 along the radii on which the pins 63 are mounted, and the switch 21 is so positioned on the plate 51 that the arm 74 rides in the recesses 75 while the pins 63 are disengaged from the star wheel 64. Moreover, the recesses 75 are respectively subtended by a small angle so that when the switch 19 is momentarily depressed, the motor 10 moves the recess 75 out from under the arm 74, thereby to provide an alternative energization circuit for the motor 10, which alternative circuit is not broken when the switch 19 is open as by a self-biasing spring (not shown).

The switch 22 is mounted on the rearward one of the brackets 34 in alignment with an aperture 76 through which the shaft 33 extends and is adapted to be closed by the rearward end of the shaft 33 when the motor 10 is energized. The switch 22 is self-biased in an open condition so that when the motor 10 is deenergized and the armature 26 is moved toward the plate 30 by means of a spring 50, the switch 22 is released and opens.

Referring now to FIG. 2 wherein is shown the electric circuit diagram of a system incorporating the remote control apparatus of the present invention. As there shown, this apparatus is adapted to be energized by means of a voltage developed across the secondary winding 80 of a step-down transformer 81 whose primary winding may be connected to a suitable source of power line voltage (not shown). Although the motor 10, as illustrated in the drawings, comprises two sets of field windings, and is, therefore, reversible, only one set of windings, namely those designated 82 and 83 in the circuit of FIG. 2, are utilized. Therefore, the windings 82 and 83 are serially connected with the channel change switch 19 across the winding 80 so that when the switch 19 is closed the motor 10 is energized. A very short time after the switch 19 is closed, the shaft 33 of the motor 10 has been rotated a sufficient amount for the disk 62 to close the switch 21. Since the switch 21 is connected in parallel with the switch 19, only a momentary depression of the switch 19 is necessary to energize the motor 10 and cause the shaft 11 to be rotated so as to tune the next receivable channel as indicated by the ones of the tabs 71 on the preselector assembly 70 which have previously been moved out of engageable position with the arm 73 of the switch 20. Also, when the motor 10 is initially energized the armature 26 moves rearwardly and the end of the shaft 63 engages the switch 22 to close it and maintain it closed for as long as the motor 10 is energized. Therefore, the motor remains energized through the switch 21 and/or the switch 20 until such time as both the switch 21 and the preselector switch 20 are open. During each interval that the shaft 11 is in one of its possible predetermined angular positions, the switch 21 is momentarily opened by virtue of the recesses 75 being positioned opposite the arm 74, but unless the receiver is tuned to a preselected channel, the switch 20 will be closed by one of the lugs 71. Therefore, the motor 10 will continue to be energized through the circuit which comprises the switch 20 and the switch 22 serially connected with the windings 82 and 83 across the secondary winding 80. During the interval that the shaft 11 is being stepped to its next channel selecting position, the switch 21 is closed so as to insure uninterrupted energization of the motor 10 until the preselector assembly 70 is so positioned that if the corresponding one of its tabs 71 has not been moved down, the switch 20 will be closed. When the shaft 11 is moved to a position at which a selectable channel is tuned in, the previously turned-down tab 71 will not engage the switch 20, and since the switch 21 is open, the motor 10 will be deenergized. The inherent inertia of the armature 26 and attached parts does not cause any further rotation of the shaft 11 nor, and more importantly, does it rotate the disk 62 the small amount which would be required to close the switch 21, because of the action of the clutch mechanism 14 which almost instantaneously disconnects the shaft 33 from the reduction gear assembly 15 when the motor 10 is deenergized. Since the switch 22 is open when the motor 10 is deenergized, if at some later time the shaft 11 is manually rotated to an unreceivable channel, thus closing the switch 20, the motor is not energized. Therefore, manual tuning of the receiver has no affect whatsoever on the remote control apparatus.

The channel change switch 19 may be located in a small control box which is connected by means of a cable 86 to the terminal board 74 from which the necessary connections to the receiver are made. Consequently, the control box 85 may be located at a considerably remote distance from the television receiver. Included within the box 85 is a variable resistor 87 which may be connected to suitable terminals of the tuner so as to provide a fine tuning control, and a potentiometer 88 which may be connected in a suitable manner to the output transformer of the receiver and to the speaker so as to provide an audio volume control adjustment remote from the receiver. The manner in which the resistor 87 and the potentiometer 88 may be connected to effect these adjustments is well known in the art and, therefore, is neither shown nor described in detail herein.

While the present invention has been described by means of a particular embodiment thereof, it will be understood that those skilled in the art may make many changes and modifications without departing from the true spirit and scope of the invention, and accordingly, all such changes and modifications which fall within the true spirit and scope of this invention are intended to be covered in the appended claims.

What is claimed as new and desired to be secured by Letters Patent of the United States is:

1. Apparatus for controlling the angular position of a drive shaft, comprising a motor having a rotatable shaft, a connector for driving said drive shaft from said motor, said connector including means which intermittently engages said drive shaft in response to continuous rotation of the shaft of said motor, a first switch serially connected with said motor in a first electric circuit, said first switch being actuated by said connector to an open condition while said means is disengaged from said drive shaft, a second switch serially connected with said motor in a second electric circuit, actuator means driven by said drive shaft for actuating said second switch to an open condition at a predetermined angular position of said drive shaft, and a manually operable switch serially connected with said motor in a third electric circuit, said first, second, and third electric circuits being adapted to be respectively connected across a source of voltage for energizing said motor.

2. Apparatus for controlling the angular position of a tuner shaft, comprising a motor having a rotatable shaft, a connector for driving said tuner shaft from said motor, said connector including means which intermittently engages said tuner shaft in response to continuous rotation of the shaft of said motor, a first switch serially connected with said motor, said first switch being actuated by said connector to an open condition only while said means is disengaged from said tuner shaft, a second switch serially connected with said motor, actuator means driven by said tuner shaft for actuating said second switch to an open condition at a predetermined angular position of said tuner shaft, and a manually operable switch connected in parallel with said first switch.

3. Apparatus for controlling the angular position of a tuner shaft, comprising a motor having a rotatable shaft, means having an output member which is rotated in increments in response to continuous rotation of an input member, said means being interconnected between the motor shaft and said tuner shaft for rotating said tuner shaft in angular increments in response to continuous rotation of said motor shaft, a first switch serially connected with said motor for connection across a source of voltage, said means opening said first switch when said input member is in a predetermined angular position, second and third switches serially connected with said motor for connection across a source of voltage, means for closing said second switch whenever said motor is energized, and means driven by said turner shaft for opening said third switch at each of one or more preselected angular positions of said turner shaft.

4. Apparatus for controlling the angular position of a tuner shaft, comprising a motor having a rotatable shaft, means having an output member which is rotated in increments in response to continuous rotation of an input member, said means being selectively interconnected between the motor shaft and said tuner shaft for rotating said tuner shaft in increments in response to continuous rotation of said motor shaft, a first switch serially connected with said motor for connection across a source of voltage, said means opening said first switch when said input member is in a predetermined angular position and said means is disconnected from said tuner shaft, second and third switches serially connected with said motor for connection across a source of voltage, means for closing said second switch whenever said motor is energized, and means driven by said tuner shaft for opening said third switch at one or more preselected angular positions of said tuner shaft.

5. Apparatus for positioning a channel selector shaft in a plurality of preselected channel selecting positions, comprising electric motor means for rotating said tuner shaft, a first energizing circuit for said motor, said first circuit being opened each time that said shaft is in a channel selecting position, a second energizing circuit for said motor, said second circuit including preselector switch means and a manually settable preselector switch actuator on said shaft for controlling actuation of said preselector switch means, said actuator comprising a disc having a plurality of spaced apart lugs extending radially therefrom, and said disc being constructed of a relatively pliable material so that said lugs may be respectively bent into or out of switch actuating positions and said second circuit opened only when said shaft is in one of said preselected channel selecting positions.

6. Apparatus for positioning a tuner shaft in predetermined angular positions, comprising an electric motor having an axially shiftable armature, means for coupling the armature of said motor to said tuner shaft, first switch means for initially energizing said motor, second switch means for deenergizing said motor when said tuner shaft is in a predetermined position, and third switch means mounted adjacent one end of said armature for closure by axial movement of said armature when said motor is energized, said third switch means being serially connected with said motor and said second switch means for preventing the initial energization of said motor by manual rotation of said tuner shaft.

7. Apparatus for positioning a tuner shaft in predetermined angular positions comprising an electric motor having an axially shiftable armature, means for coupling the armature of said motor to said tuner shaft, switch means for initiating energization of said mtor, control means including index means rotatable with said tuner shaft for initiating deenergization of said motor when said tuner shaft is in a predetermined position, and means responsive to axial movement of the armature of said motor for maintaining said motor energized after initial energization thereof by said switch means and for maintaining said motor deenergized after initial deenergization thereof by said control means.

8. Apparatus for positioning a tuner shaft in predetermined angular positions comprising an electric motor having rotor means translatable between two positions in response to energization and deenergization of said motor, means for coupling the rotor of said motor of said tuner shaft, switch means for initiating energization of said motor, control means including index means rotatable with said tuner shaft for initiating deenergization of said motor when said tuner is in a predetermined position, and means operative when said rotor is in one of said two positions for maintaining said motor energized after initial energization thereof by said switch means and operative in the other of said two positions for maintaining said motor deenergized after initial deenergization thereby by said control means.

9. Apparatus for controlling the angular position of a television tuner shaft, comprising a motor having a rotor shaft which is shifted axially when said motor is energized, a gear train, means for engaging said gear train with said rotor shaft when said motor is energized, a rotatable disc driven by said gear train and having recess means in the periphery thereof, a plate having a plurality of notches in the periphery thereof corresponding to channel selecting positions of the tuner shaft, means connecting said notched plate to the tuner shaft for rotation therewith, pin means on said disc adapted to engage the notches in said plate, whereby said pin means and said plate form a Geneva movement for intermittently rotating the tuner shaft in angular increments in response to continuous rotation of said disc, first switch means for energizing said motor upon closure thereof so that said recess means on said disc is moved from a rest position, second switch means actuated in response to movement of said recess means from a rest position for establishing a holding circuit for said motor, thereby to maintain said motor energized after said first switch means is opened, a plurality of indexing members corresponding to the channel selecting positions of the tuner shaft and each adapted to be positioned in either a first position indicating the tuner shaft is to be stopped at that channel or a second position indicating that the tuner shaft is not to be stopped at that channel, said indexing members being rotatable with the tuner shaft, a control member adapted to be engaged by those ones of said indexing members which are positioned in said first position as the tuner shaft is rotated, and means jointly responsive to engagement of said control member with one of said indexing members which is positioned in said first position and movement of said recess means on said disc to a rest position for breaking said holding circuit, thereby deenergizing said motor and stopping the tuner shaft at the channel position corresponding to said one indexing member.

10. Apparatus for controlling the angular position of a television tuner shaft, comprising a motor having a rotor shaft which is shifted axially when said motor is energized, a gear train, means for engaging said gear train with said rotor shaft when said motor is energized, a rotatable disc driven by said gear train and having recess means in the periphery thereof, a plate having a plurality of notches in the periphery thereof corresponding to channel selecting positions of the tuner shaft, means connecting said notched plate to the tuner shaft for rotation therewith, pin means on said disc adapted to engage the notches in said plate, whereby said pin means and said plate form a Geneva movement for intermittently rotating the tuner shaft in angular increments in response to continuous rotation of said disc, first switch means for energizing said motor upon closure thereof so that said disc starts to rotate, second switch means actuated in response to movement of the recess means in said disc away from a predetermined position for establishing a holding circuit for said motor, thereby to maintain said motor energized after said first switch means is opened, a plurality of indexing members corresponding to the channel selecting positions of the tuner shaft and each adapted to be positioned in either a first position indicating the tuner shaft is to be stopped at that channel or a second position indicating that the tuner shaft is not to be stopped at that channel, said indexing members being rotatable with the tuner shaft, and means including a control member engageable as the tuner shaft is rotated with those ones of said indexing members which are positioned in said first position for breaking said holding circuit when said control member engages one of said indexing members which is positioned in said first position and said recess means in said disc is in a predetermined position, thereby to cause said tuner shaft to be stopped at the channel position corresponding to said one indexing member.

11. Apparatus for controlling the angular position of a television tuner shaft, comprising a motor having a rotor shaft which is shifted axially when said motor is energized, a gear train, means for engaging said gear train with said rotor shaft when said motor is energized, a rotatable disc driven by said gear train and having recess means in the periphery thereof, a plate having a plurality of notches in the periphery thereof corresponding to channel selecting positions of the tuner shaft, means connecting said notched plate to the tuner shaft for rotation therewith, pin means on said disc adapted to engage the notches in said plate, whereby said pin means and said plate form a Geneva movement for intermittently rotating the tuner shaft in angular increments in response to continuous rotation of said disc, first switch means for energizing said motor upon closure thereof so that said disc starts to rotate, second switch means actuated in response to movement of the recess means in said disc from a predetermined position for establishing a holding circuit for said motor, thereby to maintain said motor energized after said first switch means is opened, a plurality of indexing members one for each television channel selecting position of the tuner shaft and each adapted to be positioned in either a first position indicating the tuner shaft is to be stopped at that channel or a second position indicating that the tuner shaft is not to be stopped at that channel, said indexing members being rotatable with the tuner shaft, and means including a control member engageable with said indexing members as the tuner shaft is rotated for maintaining said holding circuit until said control member engages one of said indexing members which is positioned in said first position thereof and said recess means in said disc is in a predetermined position.

12. In a system for controlling the operation of a motor for driving a driven member to preselected positions, an electric motor having a rotor constituting a driving element, a driven element mounted for rotation to preselected positions, resilient means for holding said rotor in a preselected axial position when said rotor is deenergized but responsive to the energization of said motor to permit said rotor to shift axially to another position, driving means between said rotor and said driven element engaged when said rotor is shifted during energization of said motor and disengaged when said motor is deenergized and said rotor is shifted to the other position, a source of power, first switch means for connecting said source of power to said motor, a holding circuit for connecting said source of power to said motor independently of said first switch means, said holding circuit comprising a second switch means and a third switch means, said second switch means being responsive to axial shifting of said rotor when said motor is energized to be operated to a closed position and to be opened when said motor is deenergized and when said rotor shifts in the opposite direction, said third switching means being responsive to preselected positions of said driven element to be moved to open position.

13. Means for automatically controlling the angular position of a rotatable member comprising mechanical means operably associated with said rotatable member to be actuated when the latter is at selected angular positions, a driving member in the form of an electric motor, means including mechanical coupling means responsive only to the actuation of said motor for operatively associating said driving member with said rotatable member for driving the latter to a preselected position, a source of power for energizing said motor, first switch means for connecting said source of power to said motor, second and third switch means connected in series between said motor and said source of power and adapted when closed simultaneously to constitute a holding circuit to energize said motor from said source independently of first switch means, said second switch means being normally open and being closed in response to actuation of said motor, said third switch means being closed in positions other than said selected angular positions and being opened in response to the actuation of said first mechanical means.

14. In a system for controlling the operation of an electric motor for driving a rotatable member to preselected positions, a driving member in the form of an electric motor, a driven member adapted to be rotated to preselected positions, mechanical coupling means between said driving and driven members, said coupling means being responsive to actuation of said motor for driving said driven member by said driving member, a source of power for energizing said motor, first switch means for connecting said source of power to said motor, second and third switch means connected in series between said motor and said source of power and adapted when closed simultaneously to constitute a holding circuit to energize said motor from said source independently of said first switch means, said second switch means being normally open and being closed in response to the actuation of said motor and said third switch means being normally closed and being opened in response to a preselected position of said driven member.

15. In a system for controlling the operation of a motor for driving a driven member to preselected positions, an electric motor having a rotor shiftable axially between two extreme positions, means for resiliently urging said rotor to one position when said motor is deenergized and for permitting shifting of said rotor to the other axial position when said motor is energized, a source of electrical power, mechanical driving means between said rotor and said rotatably driven member engageable for mechanically coupling said rotor to said driven element only when said rotor is shifted axially during energization of said motor, first switch means for connecting said motor to said source, second and third switch means connected in series between said motor and said source of power and adapted when closed simultaneously to constitute a holding circuit to energize said motor from said source independently of said first switch means, said second means being normally open and being closed in response to the shifting of said rotor, said third switch means being normally closed and being opened in response to a preselected position of said driven element.

16. In a system for controlling the operation of an electric motor for driving a rotatable member to preselected positions, a driving member in the form of an electric motor, a driven member adapted to be rotated to preselected positions and carrying a plurality of individually adjustable elements, a control member adapted to be moved from a first position to a second position in accordance with the position of selected ones of said individually adjustable elements as said driven member is rotated, mechanical coupling means between said driving and driven members, said coupling means being responsive to actuation of said motor for driving said driven member by said driving member, a source of power for energizing said motor, first switch means for connecting said source of power to said motor, second and third switch means connected in series between said motor and said source of power and adapted when closed simultaneously to constitute a holding circuit to energize said motor from said source independently of said first switch means, said second switch means being normally open and being closed in response to the actuation of said motor and said third switch means being controlled by said control member to be open in one of said first and second positions of said control member and closed in the other of said first and second positions.

17. Apparatus for controlling the angular position of a television tuner shaft, comprising a motor having a rotatable shaft, a gear train, means including said gear train for driving said tuner shaft from said motor shaft when said motor is energized, said gear train including an element which is arranged to move at a higher rate of speed than said tuner shaft when said motor is energized, a source of power for energizing said motor, first switch means for connecting said source of power to said motor, second switch means controlled by said element and arranged to be closed during a predetermined portion of each rotation of said element, means including said second switch means for establishing a holding circuit for said motor so that the same continues to be energized after said first switch means is opened, third switch means, means carried by said tuner shaft for controlling said third switch means so that the same is open in certain angular positions of said tuner shaft and is closed in other angular positions thereof, said third switch means being connected in parallel with said second switch means so that said motor remains energized until both said second and third switch means are coincidentally opened, whereby said tuner shaft may be accurately moved to a selected one of said certain angular positions.

18. Apparatus for controlling the angular position of a television tuner shaft, comprising a motor having a rotatable shaft, a gear train, means including said gear train for driving said tuner shaft from said motor shaft when said motor is energized, said gear train including an element which is arranged to move at a higher rate of speed than said tuner shaft when said motor is energized, a source of power for energizing said motor, first switch means for connecting said source of power to said motor, second switch means controlled by said element and arranged to be open for only a predetermined small portion of each rotation of said element, means including said second switch means for establishing a holding circuit for said motor so that the same continues to be energized after said first switch means is opened, third switch means, means carried by said tuner shaft for controlling said third switch means so that the same is open in certain angular positions of said tuner shaft and is closed in other angular positions thereof, said third switch means being connected in parallel with said second switch means so that said motor remains energized until both said second and third switch means are coincidentally opened, whereby said tuner shaft may be accurately moved to a selected one of said certain angular positions.

19. Apparatus for controlling the angular position of a television tuner shaft, comprising a motor having rotor means axially shiftable from one position to another in response to energization of said motor, a gear train, means including said gear train for driving said tuner shaft from said motor shaft when said motor is energized, said gear train including an element which is arranged to move at a higher rate of speed than said tuner shaft when said motor is energized, a source of power for energizing said motor, first switch means for connecting said source of power to said motor, second switch means controlled by said element and arranged to be closed during a predetermined portion of each rotation of said element, means including said second switch means for establishing a holding circuit for said motor so that the same continues to be energized after said switch means is opened, third switch means, means carried by said tuner shaft for controlling said third switch means so that the same is open in certain angular positions of said tuner shaft and is closed in other angular positions thereof, said third switch means being connected in parallel with said second switch means so that said motor remains energized until both said second and third switch means are coincidentally opened, whereby said tuner shaft may be accurately moved to a selected one of said certain angular positions, fourth switch means responsive to the position of said rotor means and arranged to be closed when said motor is energized, and means connecting said fourth switch means in series with said parallel connected second and third switch means, thereby to prevent initial energization of said motor by manual rotation of said tuner shaft.

20. Apparatus for controlling the angular position of a television tuner shaft, comprising a motor having a rotor shaft which is shifted axially when said motor is energized, a gear train, means for engaging said gear train with said rotor shaft when said motor is energized, a rotatable disc driven by said gear train and including a projecting member, a plate having a plurality of notches in the periphery thereof corresponding to channel selecting positions of the tuner shaft, means connecting said notched plate to the tuner shaft for rotation therewith, said projecting member on said disc being adapted to engage the notches in said plate, whereby said projecting member and said plate form a Geneva movement for intermittently rotating the tuner shaft in angular increments in response to continuous rotation of said disc, first switch means for energizing said motor upon closure thereof so that said disc is moved, second switch means actuated in response to movement of said disc for establishing a holding circuit for said motor, thereby to maintain said motor energized after said first switch means is opened, a plurality of indexing members corresponding to the channel selecting positions of the tuner shaft and each adapted to be positioned in either a first position indicating the tuner shaft is to be stopped at that channel or a second position indicating that the tuner shaft is not to be stopped at that channel, said indexing members being rotatable with the tuner shaft, a control member adapted to be engaged by those ones of said indexing members which are positioned in said first position as the tuner shaft is rotated, and means jointly responsive to engagement of said control member with one of said indexing members and movement of said disc to a predetermined position for breaking said holding circuit, thereby deenergizing said motor and stopping the tuner shaft at the channel position corresponding to said one indexing member.

21. Apparatus for controlling the angular position of a television tuner shaft, comprising a motor having a rotatable shaft, means having an output member which is rotated in increments in response to continuous rotation of an input member, said means being arranged to be connected between said motor shaft and the tuner shaft, first switch means for energizing said motor upon closure thereof, second switch means responsive to movement of said input member when said motor is energized for establishing a holding circuit for said motor, thereby to maintain said motor energized after said first switch means is opened, a plurality of indexing members corresponding to the channel selecting positions of the tuner shaft and each adapted to be positioned in either a first position indicating the tuner shaft to be stopped at that channel or a second position indicating that the tuner shaft is not to be stopped at that channel, said indexing members being rotatable with the tuner shaft, and means including a control member engageable with said indexing members as the tuner shaft is rotated for maintaining said holding circuit until said control member engages one of said indexing members which is positioned in said first position thereof and said input member is in a predetermined position.

22. Apparatus for controlling the angular position of a television tuner shaft, comprising a motor having a rotatable shaft, means having an output member which is rotated in increments in response to continuous rotation of an input member, said means being arranged to be connected between said motor shaft and the tuner shaft, first switch means for energizing said motor upon closure thereof, second switch means responsive to movement of said input member when said motor is energized for establishing a holding circuit for said motor, thereby to maintain said motor energized after said first switch means is opened, a plurality of indexing members corresponding to the channel selecting positions of the tuner shaft and each adapted to be positioned in either a first position indicating the tuner shaft is to be stopped at that channel or a second position indicating that the tuner shaft is not to be stopped at that channel, said indexing members being rotatable with the tuner shaft, a control member adapted to be engaged by those ones of said indexing members which are positioned in said first position as the tuner shaft is rotated, and means jointly responsive to engagement of said control member with one of said indexing members and movement of said input member to a predetermined position for breaking said holding circuit, thereby to cause the tuner shaft to be stopped at the channel position corresponding to said one indexing member.

References Cited by the Examiner

UNITED STATES PATENTS

| | | | |
|---|---|---|---|
| 2,204,065 | 6/1940 | Beizer et al. | 318—33 |
| 2,345,778 | 4/1944 | Van Lammeren et al. | 310—209 |
| 2,833,976 | 5/1958 | Kennedy et al. | 318—467 |
| 2,929,259 | 3/1960 | Chamberlain | 318—467 X |
| 3,024,402 | 3/1962 | Adel | 318—467 |
| 3,070,736 | 12/1962 | Poley | 318—467 |

ORIS L. RADER, *Primary Examiner.*